US007884790B2

(12) United States Patent
Sakurai

(10) Patent No.: US 7,884,790 B2
(45) Date of Patent: Feb. 8, 2011

(54) DISPLAY DEVICE AND DRIVING METHOD OF DISPLAY DEVICE

(75) Inventor: Hiroyuki Sakurai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1071 days.

(21) Appl. No.: 11/449,271

(22) Filed: Jun. 8, 2006

(65) Prior Publication Data

US 2007/0002082 A1 Jan. 4, 2007

(30) Foreign Application Priority Data

Jun. 10, 2005 (JP) ............................ 2005-170308

(51) Int. Cl.
*G09G 3/36* (2006.01)
*G09G 5/10* (2006.01)
*G06F 3/038* (2006.01)

(52) U.S. Cl. .......................... 345/89; 345/94; 345/204; 345/691

(58) Field of Classification Search ......... 345/690–692, 345/55–102, 204–214
See application file for complete search history.

(56) References Cited

U.S. PATENT DOCUMENTS 6,989,824 B1 * 1/2006 Ishii et al. .................. 345/204
7,528,872 B2 * 5/2009 Gomi et al. ................. 348/296
2003/0090500 A1 * 5/2003 Yamazaki .................. 345/690
2004/0145597 A1 * 7/2004 Ito ............................ 345/690

FOREIGN PATENT DOCUMENTS

JP 2003-216106 7/2003

* cited by examiner

*Primary Examiner*—Bipin Shalwala
*Assistant Examiner*—Sosina Abebe
(74) *Attorney, Agent, or Firm*—Robert J. Depke; Rockey, Depke & Lyons, LLC

(57) ABSTRACT

A digital driving display device to make gradation display by pulse width modulation includes: a pixel array unit arranging pixels having an electrooptic element and incorporating a memory in a matrix, disposing a scanning line for each row in a pixel arrangement in the matrix, and a signal line for each column; a horizontal driving section inputting display data in a block for each scanning line having a low to a high gradation level subfield for each bit of the data defining gradation levels of the pixels and in a period for weight of the bit, sampling-latching, sequentially transferring, and supplying the data to the signal line; and a vertical driving section selecting and scanning pixels of the pixel array unit in a row and performing scanning while jumping rows to write the data supplied in the block from the horizontal driving section to pixels of the pixel array unit.

2 Claims, 10 Drawing Sheets

FIG. 11

SEQUENTIAL SCANNING

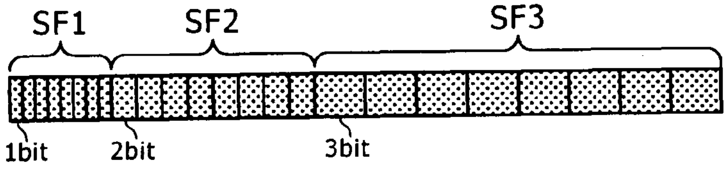

| | | | |
|---|---|---|---|
| NUMBER OF PIXELS | NUMBER OF SIGNAL LINES | H | [lines] |
| | NUMBER OF SCANNING LINES | V | [lines] |
| NUMBER OF BITS | | B | [bit] |
| FRAME FREQUENCY | | F | [Hz] |
| NUMBER OF PIECES OF PARALLEL VIDEO DATA | | N | [pieces] |
| NUMBER OF SUBFIELDS | | (B) | [pieces] |
| SUBFIELD TIME (MINIMUM) | | $\frac{1}{F}\times\frac{1}{2^B-1}$ | [sec] |
| MINIMUM SAMPLING TIME Ta | | $\frac{N}{H}\times\frac{1}{V}\times\frac{1}{F}\times\frac{1}{2^B-1}$ | [sec] |

INTERLACED SCANNING

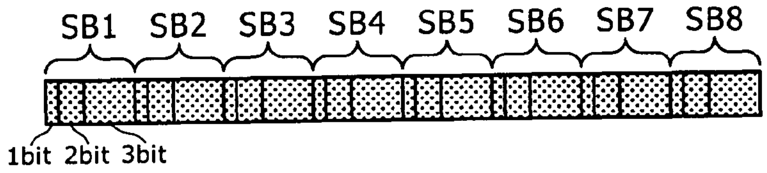

| | | | |
|---|---|---|---|
| NUMBER OF PIXELS | NUMBER OF SIGNAL LINES | H | [lines] |
| | NUMBER OF SCANNING LINES | V | [lines] |
| NUMBER OF BITS | | B | [bit] |
| FRAME FREQUENCY | | F | [Hz] |
| NUMBER OF PIECES OF PARALLEL VIDEO DATA | | N | [pieces] |
| NUMBER OF SUBBLOCKS | | V | [pieces] |
| SUBBLOCK TIME | | $\frac{1}{F}\times\frac{1}{V}$ | [sec] |
| MINIMUM SAMPLING TIME Tb | | $\frac{N}{H}\times\frac{1}{V}\times\frac{1}{F}\times\frac{1}{B}$ | [sec] |

| | | | |
|---|---|---|---|
| NUMBER OF PIXELS | NUMBER OF SIGNAL LINES | 1366 | [lines] |
| | NUMBER OF SCANNING LINES | 768 | [lines] |
| FRAME FREQUENCY | | 120 | [Hz] |
| NUMBER OF BITS | | 10 | [bit] |
| NUMBER OF SUBFIELDS | | 14 | [pieces] |

DISPLAY DEVICE AND DRIVING METHOD OF DISPLAY DEVICE

CROSS REFERENCES TO RELATED APPLICATIONS

The present invention contains subject matter related to Japanese Patent Application JP 2005-170308 filed with the Japanese Patent Office on Jun. 10, 2005, the entire contents of which being incorporated herein by reference.

BACKGROUND OF THE INVENTION

1. Field of the Invention

The present invention relates to a display device and a driving method of the display device, and particularly to a digital driving display device that makes gradation display by pulse width modulation, and a driving method of the display device.

2. Description of Related Art

When a case of three bits (eight gradation levels) is taken as an example, as shown in FIG. 1, a digital driving display device that makes gradation display by pulse width modulation (PWM) ideally uses a gradation display method for displaying eight gradation levels by setting a one-bit data of a 2.4 ms width, for example, as a unit and combining pieces of such unit data so as to correspond to each of a first gradation level to a seventh gradation level.

However, in this ideal gradation display method, seven pieces of data is used, which is too large a number. Therefore, in practice, a gradation display method is used in which as shown in FIG. 2, three pieces of data having a period length ratio of 1 (first bit):2 (second bit):4 (third bit) are prepared, and eight gradation levels are displayed by a combination of the three pieces of data.

A digital driving display device using the latter gradation display method will be described in the following with reference to FIG. 3. FIG. 3 is a timing chart showing a relation between signal outputs of sequential scanning in related ordinary digital driving and pixels in which to write data on a time scale. FIG. 3 shows a case of eight scanning lines for convenience of description.

As is clear from FIG. 3, a related ordinary digital driving display device uses a subfield driving method. Specifically, one frame (1 F) period is divided into subfields SF1, SF2, and SF3 corresponding to respective bits (a first bit, a second bit, and a third bit in this example) of display data defining a gradation level of a pixel and having period lengths corresponding to the weights of the corresponding bits, and a ratio of a driving on period or an off period to one frame is controlled stepwise by turning on or off an electrooptic element of the pixel according to the corresponding bit in each of the subfields SF1, SF2, and SF3. The data is written to the pixel by line-sequential scanning in each of the subfields SF1, SF2, and SF3.

FIG. 4 is a timing chart showing on a time scale a flow from sampling latching of display data transferred to the display device to then load latching of the display data to writing of the display data to signal lines. The digital driving display device using the subfield driving method writes data to pixels by line-sequential scanning in each subfield. Hence, the transfer rate (sampling time) of the display data transferred to the display device is highest on a low gradation level side, and the number of gradation levels is limited by the transfer rate of the minimum bit (first bit). It is therefore difficult to increase the number of gradation levels and sufficiently express a low gradation level side.

Thus, in the past, pixels are sorted into two groups of odd-numbered lines and even-numbered lines, while one frame is divided into 15 subframes, which are each a period corresponding to weight of the least significant bit of four-bit gradation data. Subfields as units of a period during which an electro-optic element is turned on or off are made to correspond to each of the groups of the odd-numbered lines and the even-numbered lines and assigned to respective bits of the gradation data. In addition, period lengths of the subfields are defined so as to correspond to weights of the assigned bits with subframes as units. Further, first periods of the subfields assigned to the groups of the odd-numbered lines and the even-numbered lines belong to subframes different from each other (see Japanese Patent Laid-open No. 2003-216106 referred as Patent Document 1, for example).

SUMMARY OF THE INVENTION

However, while the related technique can reduce the transfer rate of the display data transferred to the display device to ½ because the subfields are sorted into the two groups for the odd-numbered lines and the even-numbered lines, a further substantial reduction of the transfer rate is difficult to be expected.

It is accordingly desirable to provide a display device and a driving method of the display device that can greatly reduce the transfer rate of display data.

According to an embodiment of the present invention, there is provided a digital driving display device for making gradation display by pulse width modulation (PWM), the display device including a pixel array unit formed by two-dimensionally arranging pixels including an electrooptic element and incorporating a memory in a form of a matrix, disposing a scanning line for each row in a pixel arrangement in the form of the matrix, and disposing a signal line for each column. Display data having a low gradation level subfield to a high gradation level subfield as one block unit for each scanning line, the subfields corresponding to each bit of the display data defining gradation levels of the pixels and having a period corresponding to weight of the corresponding bit, is input. Then, the input display data is sampling-latched, sequentially transferred by load latch circuits in a plurality of stages according to period length of the subfield, and supplied to each signal line, while interlaced scanning is performed in which rows are jumped to perform scanning so as to write the display data supplied in the block unit to pixels of the pixel array unit in order in row units.

In the digital driving display device for making gradation display by pulse width modulation, display data defining gradation levels of the pixels is made to have a low gradation level subfield to a high gradation level subfield as one block unit for each scanning line. It is thereby possible to transfer the display data at a uniform transfer rate. Then, the display data is sampling-latched and sequentially transferred by load latch circuits in a plurality of stages according to period length of the subfield, and the display data is written to pixels by interlaced scanning. Thus, since the data is written with a subblock as a unit, a sampling time is constant without depending on the bits.

According to an embodiment of the present invention, it is possible to transfer the display data at a uniform transfer rate and thus greatly reduce the transfer rate of the display data. In addition, since the sampling time is constant without depending on bits, the number of gradation levels is not limited by the transfer rate of minimum bits.

BRIEF DESCRIPTION OF THE DRAWINGS

FIG. 11 is a diagram showing a result of comparison between a case of sequential scanning and a case of interlaced scanning with respect to the transfer rate of input display data.

DETAILED DESCRIPTION OF THE PREFERRED EMBODIMENT

A preferred embodiment of the present invention will hereinafter be described in detail with reference to the drawings.

Figure 1:
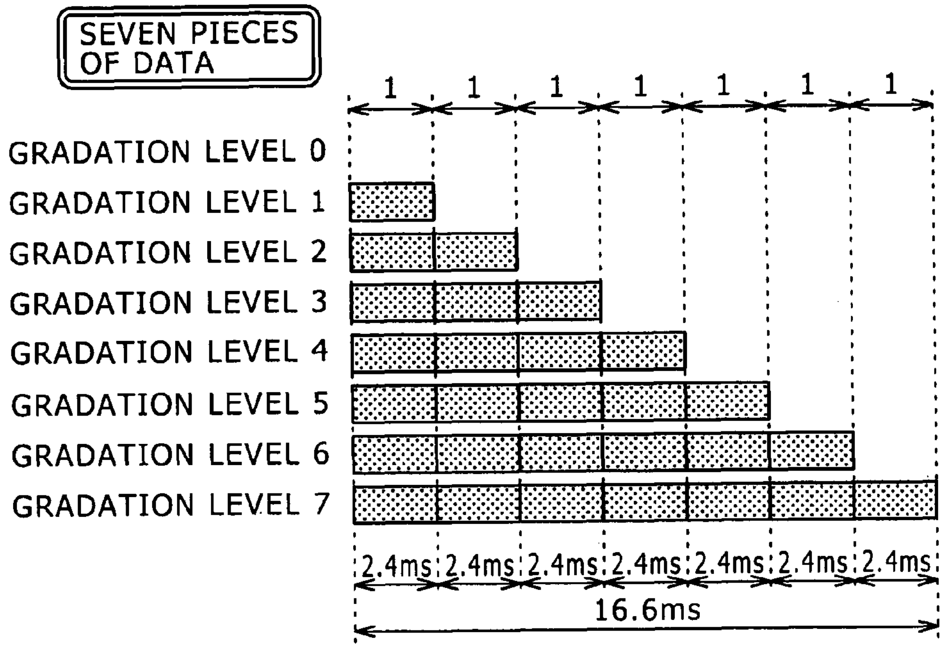
FIG. 1 is a diagram of assistance in explaining an ideal gradation display method in digital driving.
Figure 2:
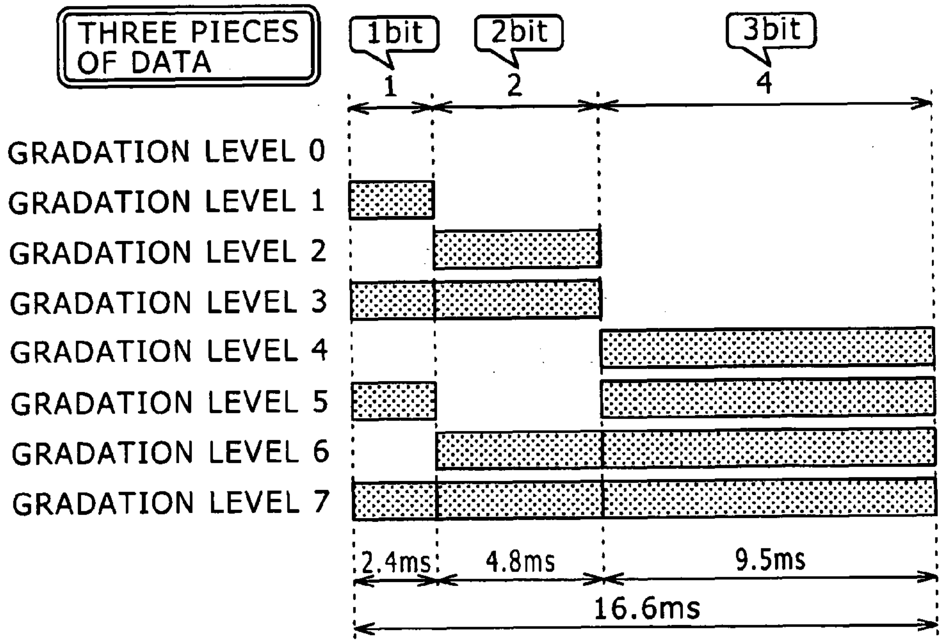
FIG. 2 is a diagram of assistance in explaining an actual gradation display method in digital driving.
Figure 3:
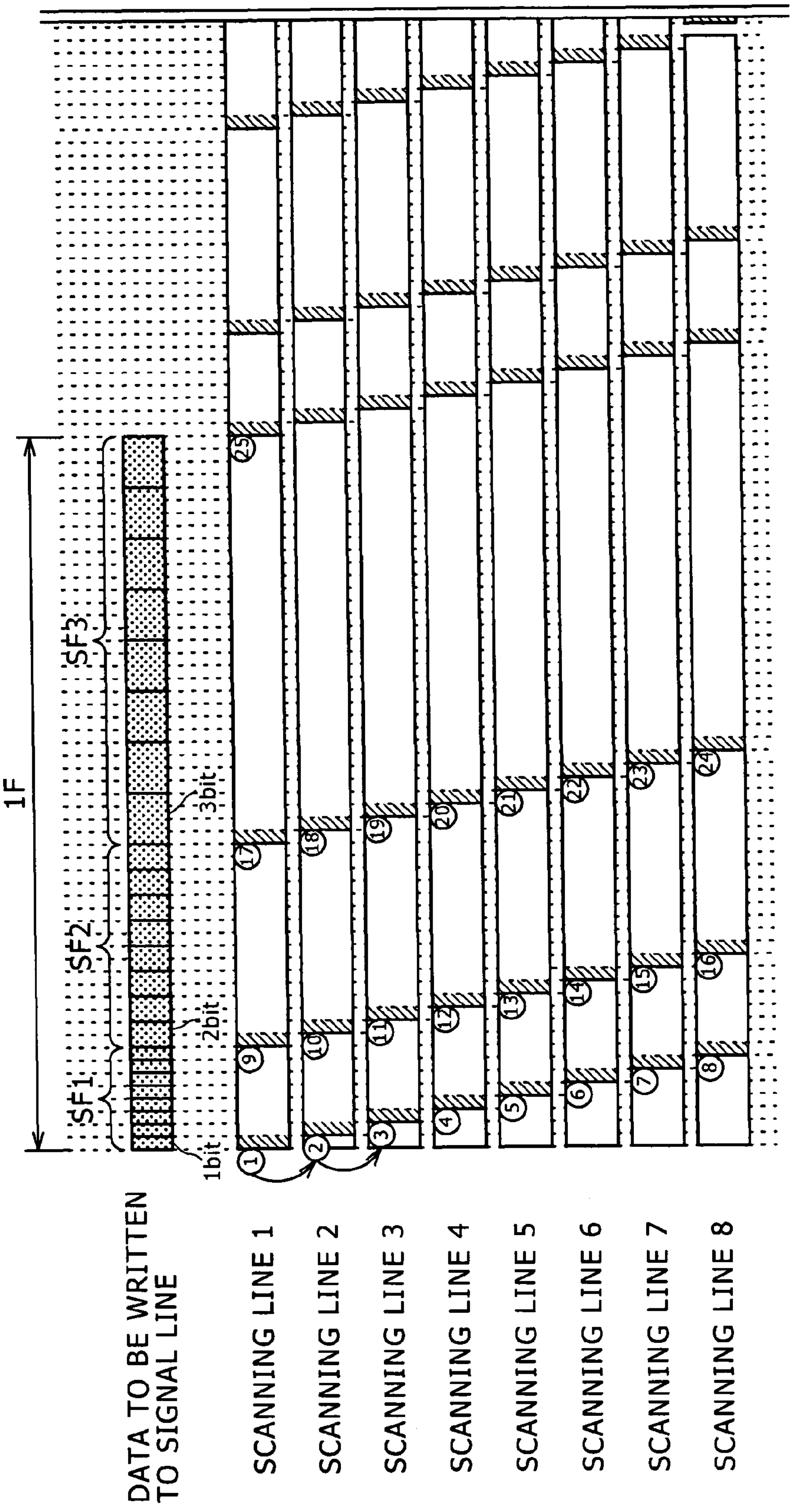
FIG. 3 is a timing chart showing a relation between signal outputs of sequential scanning in related ordinary digital driving and pixels in which to write data on a time scale.
Figure 4:
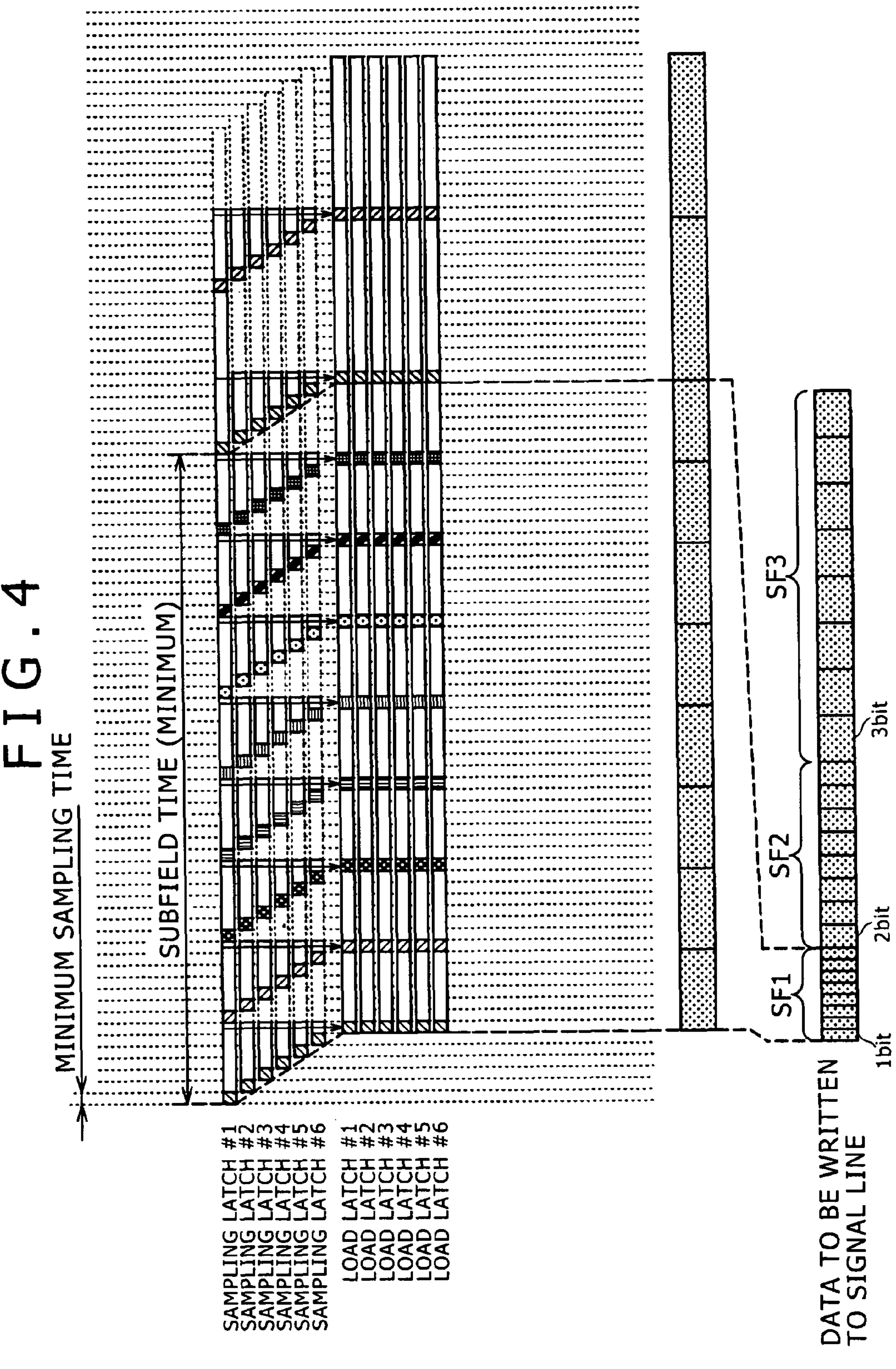
FIG. 4 is a timing chart showing on a time scale a flow from sampling latching of display data transferred to a display device to then load latching of the display data to writing of the display data to signal lines.
Figure 5:
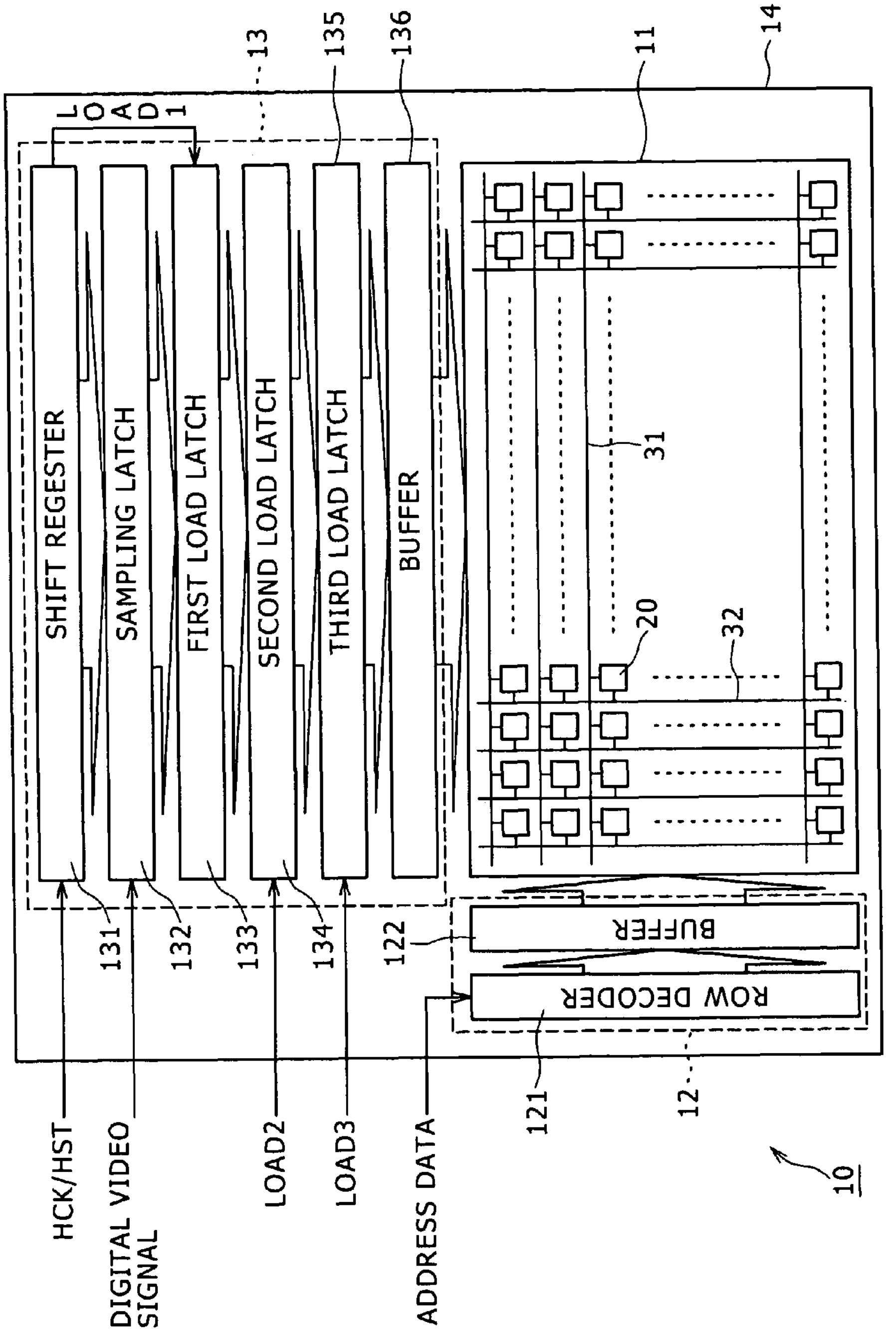
FIG. 5 is a block diagram showing an outline of a configuration of an active matrix type liquid crystal display device according to an embodiment of the present invention.

FIG. 5 is a block diagram showing an outline of a configuration of a display device according to an embodiment of the present invention. Description in the following will be made by taking, as an example of the display device, a digital driving active matrix type liquid crystal display device that uses a liquid crystal cell as an electrooptic element of a pixel and makes gradation display by pulse width modulation (PWM).

The active matrix type liquid crystal display device 10 according to the present embodiment includes a pixel array unit 11, a vertical driving circuit 12, and a horizontal driving circuit 13. These circuits are integrated on a same substrate (hereinafter referred to as a liquid crystal panel 14) as the pixel array unit 11.

The pixel array unit 11 is formed such that pixels 20 including a liquid crystal cell as an electrooptic element and incorporating a memory are two-dimensionally arranged in the form of a matrix on a transparent insulating substrate, for example a first glass substrate (not shown), a scanning line 31 is disposed for each pixel row in the pixel arrangement in the form of a matrix, and a signal line 32 is disposed for each pixel column. The liquid crystal panel 14 is formed by disposing a second glass substrate with a predetermined space between the first glass substrate and the second glass substrate and filling a liquid crystal material into the space between these two glass substrates.

(Pixel Circuit)

Concrete circuit configurations of pixels 20 including a memory will be described in the following.

Figure 6:
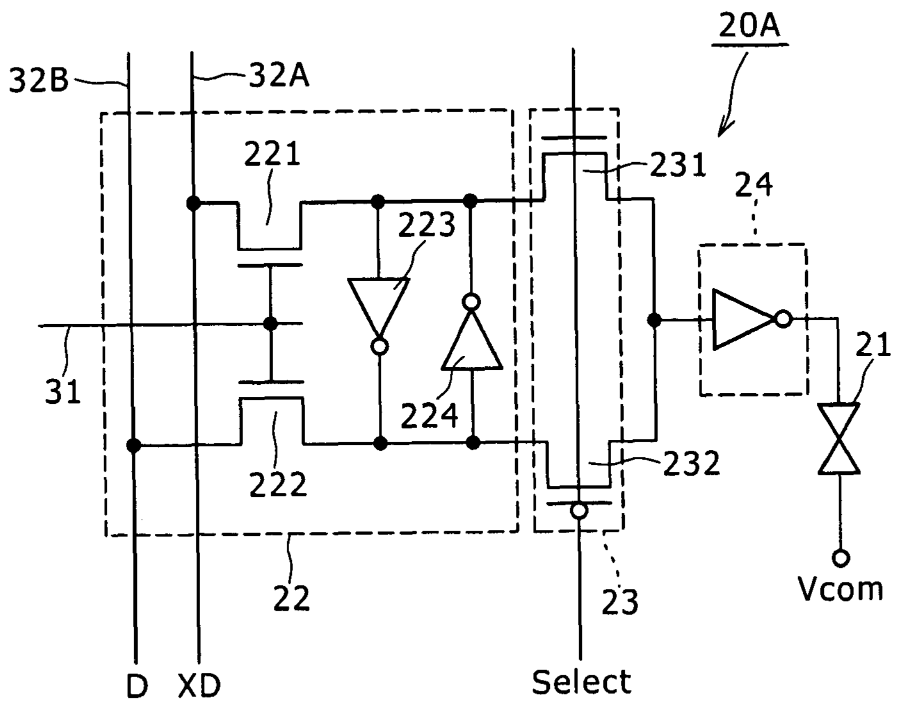
FIG. 6 is a circuit diagram showing a configuration of a pixel having an SRAM configuration.

FIG. 6 is a circuit diagram showing a configuration of a pixel 20A having an SRAM (Static Random Access Memory) configuration. The pixel 20A in this example has a liquid crystal cell 21, an SRAM 22, a polarity selector 23, and a buffer 24.

The SRAM 22 includes for example Nch pixel transistors 221 and 222 having respective control electrodes commonly connected to a scanning line 31 and having respective one-side main electrodes connected to signal lines 32A and 32B, and inverters 223 and 224 forming a latch circuit, the inverters 223 and 224 being connected in parallel with each other in opposite directions from each other between respective other-side main electrodes of the pixel transistors 221 and 222.

The polarity selector 23 includes an Nch selecting transistor 231 having a one-side main electrode connected to one output terminal of the SRAM 22, and a Pch selecting transistor 232 having a one-side main electrode connected to another output terminal of the SRAM 22 and an other-side main electrode commonly connected to an other-side main electrode of the selecting transistor 231. A polarity selecting signal Select is given to respective control electrodes of the selecting transistors 231 and 232.

The buffer 24 has an input terminal thereof connected to an output terminal of the polarity selector 23, that is, a common connection node to which the other-side main electrodes of the selecting transistors 231 and 232 are connected, and has an output terminal thereof connected to one electrode of the liquid crystal cell 21, that is, a pixel electrode. A common potential Vcom, which is commonly supplied to each pixel, is given to another electrode of the liquid crystal cell 21, that is, a counter electrode.

Figure 7:
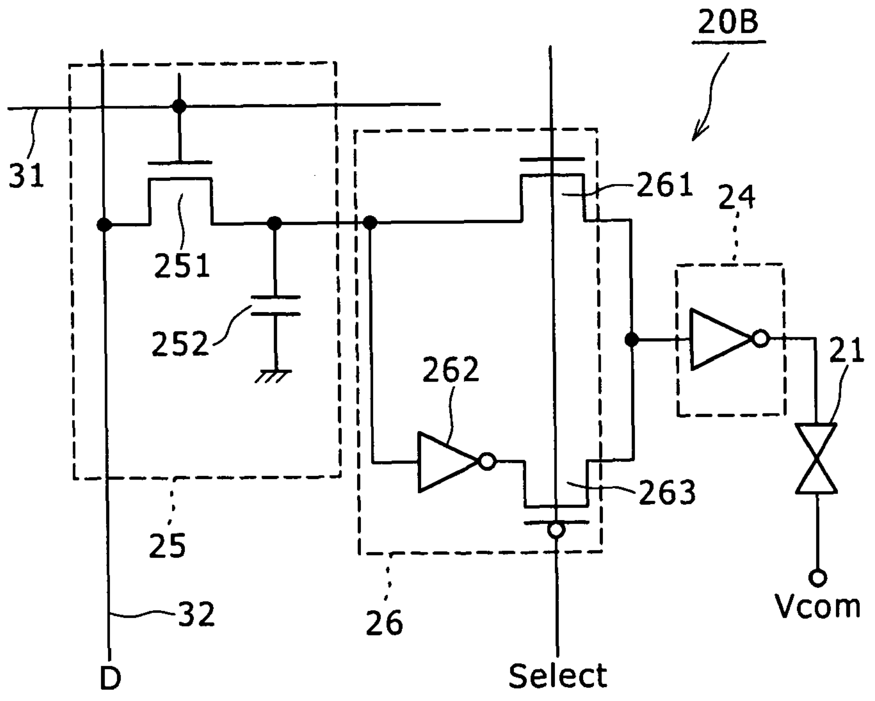
FIG. 7 is a circuit diagram showing a configuration of a pixel having a DRAM configuration.

FIG. 7 is a circuit diagram showing a configuration of a pixel 20B having a DRAM (Dynamic Random Access Memory) configuration. In FIG. 7, parts similar to those of FIG. 6 are identified by the same reference numerals. The pixel 20B has a liquid crystal cell 21, a DRAM 25, a polarity selector 26, and a buffer 24.

The DRAM 25 includes for example an Nch pixel transistor 251 having a control electrode connected to a scanning line 31 and having a one-side main electrode connected to a signal line 32, and a memory capacitance 252 connected between an other-side main electrode of the pixel transistor 251 and a ground.

The polarity selector 26 includes an Nch selecting transistor 261 having a one-side main electrode connected to an output terminal of the DRAM 25, an inverter 262 having an input terminal connected to the output terminal of the DRAM 25, and a Pch selecting transistor 263 having a one-side main electrode connected to an output terminal of the inverter 262 and an other-side main electrode commonly connected to an other-side main electrode of the selecting transistor 261. A polarity selecting signal Select is given to respective control electrodes of the selecting transistors 261 and 263.

The buffer 24 has an input terminal thereof connected to an output terminal of the polarity selector 26, that is, a common connection node to which the other-side main electrodes of the selecting transistors 261 and 263 are connected, and has an output terminal thereof connected to a pixel electrode of the liquid crystal cell 21. A common potential Vcom, which is commonly supplied to each pixel, is given to a counter electrode of the liquid crystal cell 21.

In the liquid crystal display device 10 according to the present embodiment using the SRAM pixel 20A or the DRAM pixel 20B having the above-described configuration as a pixel 20 including a memory, a so-called common inversion driving method in which the polarity of the common potential Vcom is inverted in each field, for example, is employed as a method for driving the liquid crystal cell 21.

Figure 8:
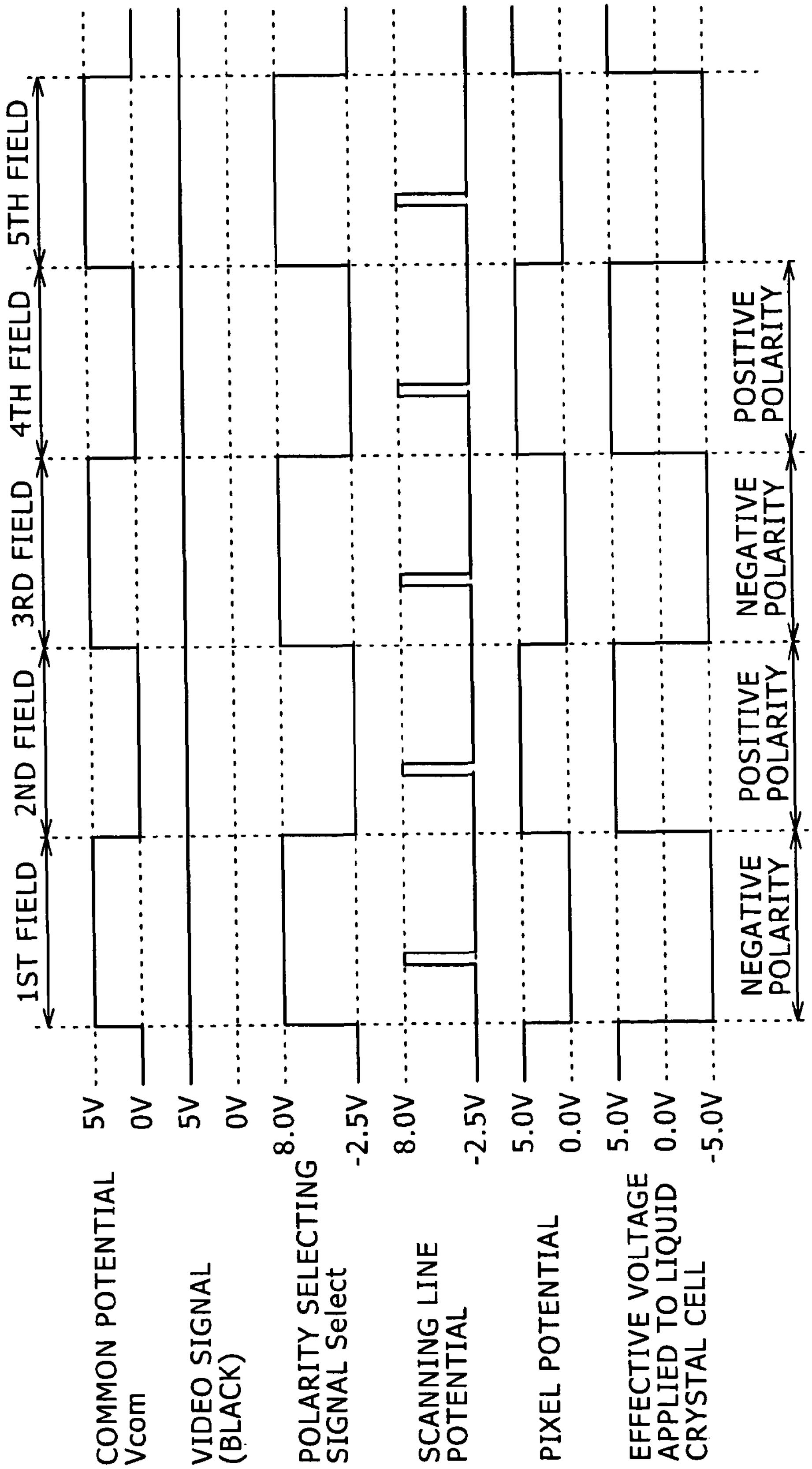
FIG. 8 is a waveform chart showing signal waveforms of parts when a common inversion driving method is employed.

FIG. 8 shows signal waveforms of the common inversion driving method. FIG. 8 shows respective waveforms of the common potential Vcom, a video signal (black), the polarity selecting signal Select, the potential of the scanning line 31, the potential of the pixel 20, and an effective voltage applied to the liquid crystal cell 21. As is clear from this waveform chart, with the pixel 20 including a memory, the polarity of the pixel potential is inverted when the polarity of the common potential Vcom is inverted.

Returning to FIG. 5, the vertical driving circuit 12 is formed by for example a row decoder 121 and a buffer 122. The row decoder 121 in the vertical driving circuit 12 outputs a scanning pulse for selecting pixels 20 in a row unit of the pixel array unit 11 on the basis of address data input from the outside of the liquid crystal panel 14.

One feature of the present invention is order of selection of selection rows by the row decoder 121. Details thereof will be described later. On the basis of the scanning pulse output from the row decoder 121, the buffer 122 selects and drives pixels 20 in a selected row via a scanning line 31 for the selected row in the pixel array unit 11.

The horizontal driving circuit 13 includes a shift register 131, a sampling latch circuit 132, a first load latch circuit 133, a second load latch circuit 134, and a third load latch circuit 135 in three stages, for example, and a buffer 136. The load latch circuits 133, 134, and 135 in this case function as a line memory for temporarily storing pixel data for one row (one line). The number of load latch circuit stages is determined by the number of subfields of digital video data (display data) input from the outside of the liquid crystal panel 14 to the horizontal driving circuit 13.

A subfield refers to a unit corresponding to each bit of display data defining-a gradation level of a pixel 20 and having a period corresponding to the weight of the corresponding bit. In the present example, digital video data having for example three bits, that is, three subfields (eight gradation levels) is used as display data, and hence the number of load latch circuit stages is three.

Incidentally, in FIG. 5, the horizontal driving circuit 13 is drawn in a very large size with respect to the size of the pixel array unit 11 for convenience of description. However, as described above, each of the first load latch circuit 133, the second load latch circuit 134, and the third load latch circuit 135 is a line memory, and one of the first load latch circuit 133, the second load latch circuit 134, and the third load latch circuit 135 corresponds to one row of pixels 20 including a memory. Thus, in practice, the size in a vertical direction of the horizontal driving circuit 13 is very small with respect to the pixel array unit 11.

A ratio between period lengths of three subfields (a first bit, a second bit, and a third bit) of digital video data is set at 1:2:4. Eight gradation levels are displayed by a combination of these subfields. The digital video data has a low gradation level subfield to a high gradation level subfield (first to third bits) as one block unit (hereinafter described as a "subblock") of display data for each row, that is, each scanning line. Thus, letting H be the number of signal lines (number of pixels in a horizontal direction), the display data of the subblock includes a set of H pieces of first-bit serial data, H pieces of second-bit serial data, and H pieces of third-bit serial data.

Figure 9:
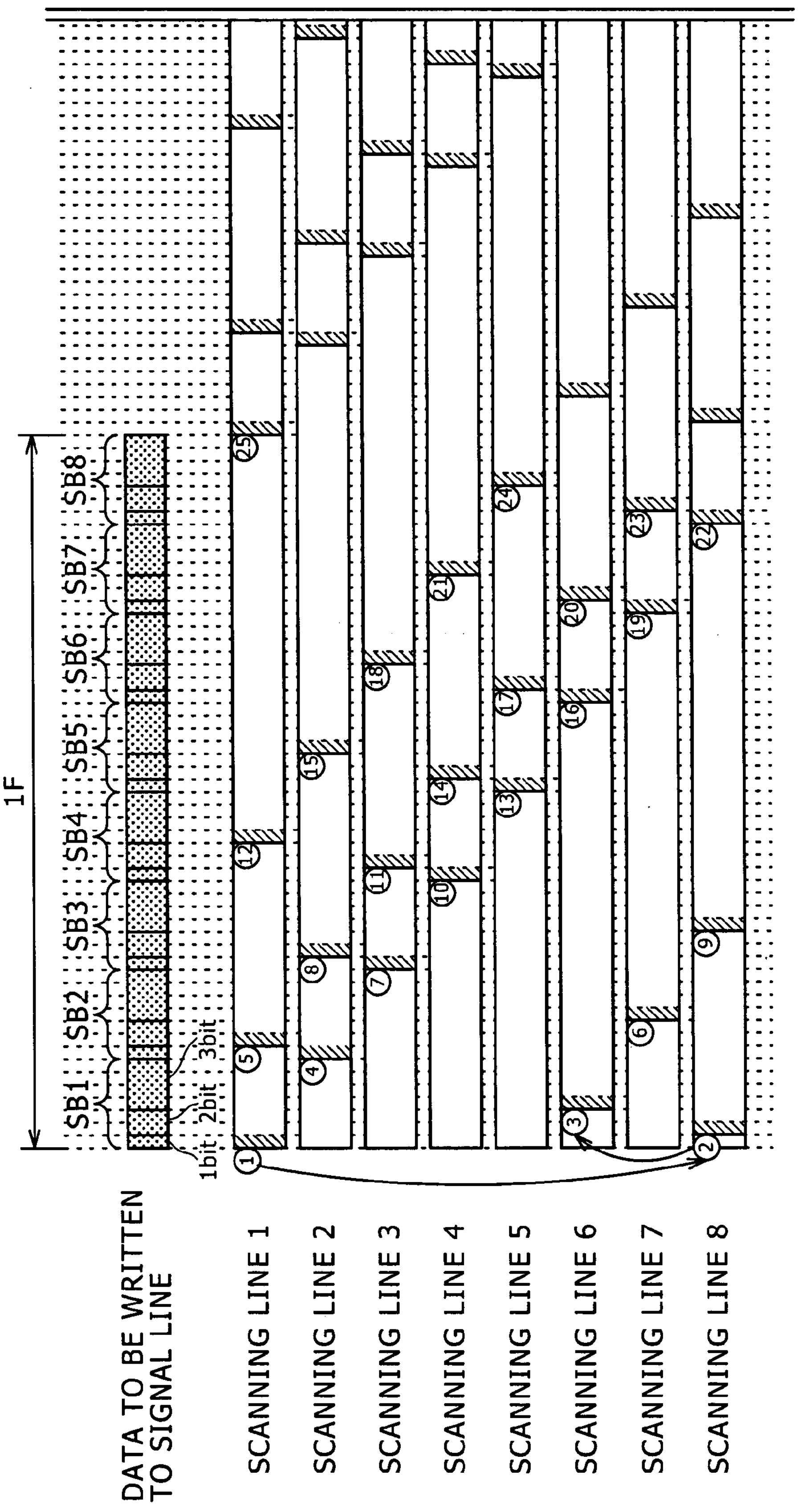
FIG. 9 is a timing chart showing a relation between signal outputs of interlaced scanning and pixels in which to write data on a time scale.

In the present invention, the digital video data of this subblock composition is written to pixels 20 by interlaced scanning in which rows are jumped to perform scanning rather than sequential scanning of rows (scanning lines 31). FIG. 9 shows a relation between signal outputs of interlaced scanning and pixels to be written on a time scale. In this case, to facilitate understanding, the number of scanning lines 31 is set to eight. Hence, the digital video data is formed with eight subblocks SB1 to SB8 as units corresponding to eight scanning lines 1 to 8, and periods of the subblocks SB1 to SB8 form one field period.

The data of the subblocks SB1 to SB8 is written in order in row units to pixels 20 connected to each of the scanning lines 1 to 8. Specifically, in FIG. 9, one screen may be constructed by writing the data of the subblocks SB1 to SB8 to the pixels 20 connected to each of the scanning lines 1 to 8 such that data of respective low gradation level subfields (first bit) of the subblocks SB1 to SB8 is arranged at respective timing positions of numbers 1, 4, 7, 10, 13, 16, 19, and 22 enclosed by a circle on the scanning lines 1 to 8.

In order to thus make the digital video data have a subblock composition and achieve image display using the data of the subblock composition, the present invention writes the data of the subblocks SB1 to SB8 in order in row units to the pixels 20 connected to each of the scanning lines 1 to 8 by interlaced scanning in which rows are jumped to perform scanning. Numbers enclosed by a circle in FIG. 9 indicate order of data to be written to pixels 20 while jumping rows.

Specifically, for the first subblock SB1, a first-bit data group is written to the scanning line 1 by the interlaced scanning, a second-bit data group is written to the scanning line 8 by the interlaced scanning, and a third-bit data group is written to the scanning line 6 by the interlaced scanning (order of numbers 1, 2, and 3 enclosed by a circle in FIG. 9). Next, for the subblock SB2, a first-bit data group is written to the scanning line 2 by the interlaced scanning, a second-bit data group is written to the scanning line 1 by the interlaced scanning, and a third-bit data group is written to the scanning line 7 by the interlaced scanning (order of numbers 4, 5, and 6 enclosed by a circle in FIG. 9).

Next, for the subblock SB3, a first-bit data group is written to the scanning line 3 by the interlaced scanning, a second-bit data group is written to the scanning line 2 by the interlaced scanning, and a third-bit data group is written to the scanning line 8 by the interlaced scanning (order of numbers 7, 8, and 9 enclosed by a circle in FIG. 9). Next, for the subblock SB4, a first-bit data group is written to the scanning line 4 by the interlaced scanning, a second-bit data group is written to the scanning line 3 by the interlaced scanning, and a third-bit data group is written to the scanning line 1 by the interlaced scanning (order of numbers 10, 11, and 12 enclosed by a circle in FIG. 9).

Next, for the subblock SB5, a first-bit data group is written to the scanning line 5 by the interlaced scanning, a second-bit data group is written to the scanning line 4 by the interlaced scanning, and a third-bit data group is written to the scanning line 2 by the interlaced scanning (order of numbers 13, 14, and 15 enclosed by a circle in FIG. 9). Next, for the subblock SB6, a first-bit data group is written to the scanning line 6 by the interlaced scanning, a second-bit data group is written to the scanning line 5 by the interlaced scanning, and a third-bit data group is written to the scanning line 3 by the interlaced scanning (order of numbers 16, 17, and 18 enclosed by a circle in FIG. 9).

Next, for the subblock SB7, a first-bit data group is written to the scanning line 7 by the interlaced scanning, a second-bit data group is written to the scanning line 6 by the interlaced scanning, and a third-bit data group is written to the scanning line 4 by the interlaced scanning (order of numbers 19, 20, and 21 enclosed by a circle in FIG. 9). Next, for the subblock SB8, a first-bit data group is written to the scanning line 8 by the interlaced scanning, a second-bit data group is written to the scanning line 7 by the interlaced scanning, and a third-bit data group is written to the scanning line 5 by the interlaced scanning (order of numbers 22, 23, and 24 enclosed by a circle in FIG. 9).

The data of the subblocks SB1 to SB8 is written in order in row units to pixels 20 connected to each of the scanning lines 1 to 8 by the above-described series of interlaced scanning operations, whereby one screen is constructed. This interlaced scanning is performed under control of the row decoder 121 in the vertical driving circuit 12.

Figure 10:
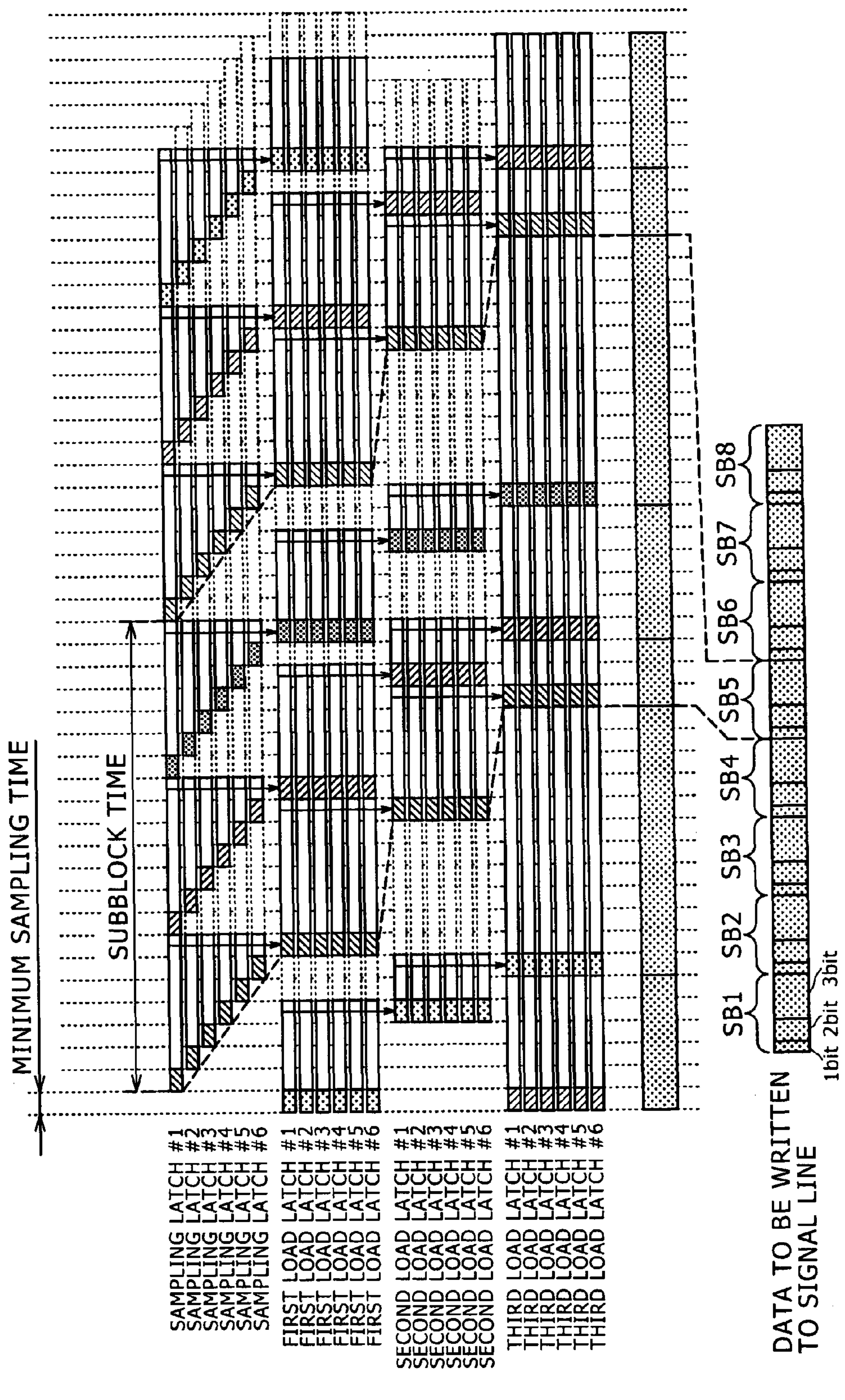
FIG. 10 is a timing chart of assistance in explaining the operation of a horizontal driving circuit.

The operation of the horizontal driving circuit 13 will next be described with reference to a timing chart of FIG. 10. In this case, a timing relation in the case of the subblock SB5 is taken as an example.

In the horizontal driving circuit 13, when a start pulse HST is input from the outside of the liquid crystal panel 14 to the shift register 131, the shift register 131 starts a shift operation in synchronism with a horizontal clock HCK similarly supplied to the shift register 131 from the outside of the liquid crystal panel 14. The shift register 131 sequentially outputs a sampling pulse from each transfer stage (shift stage).

The sampling latch circuit 132 samples digital video data of the subblock composition with three-bit data as one block for each scanning line in synchronism with the sampling pulse sequentially output from the shift register 131. The sampling latch circuit 132 thereby converts H pieces of first-bit serial data within the subblock SB5 into H pieces of parallel data. A time taken to sample one piece of serial data is a minimum sampling time. Incidentally, to facilitate understanding, the number H of signal lines 32 is six.

The H pieces of first-bit parallel data are loaded into the first load latch circuit 133 in timing of an end of first-bit sampling in synchronism with a loading signal LOAD1 output from the shift register 131. The H pieces of first-bit parallel data latched by the first load latch circuit 133 are thereafter sequentially loaded into the second and third load latch circuits 134 and 135 in synchronism with loading signals LOAD2 and LOAD3 input from the outside of the liquid crystal panel 14. The H pieces of first-bit parallel data are then written to each of the signal lines 32 of the pixel array unit 11 via the buffer 136.

After ending the serial-parallel conversion of the H pieces of first-bit serial data, the sampling latch circuit 132 performs the serial-parallel conversion of H pieces of second-bit serial data and H pieces of third-bit serial data as in the case of the first bit. The first to third load latch circuits 133 to 135 and the buffer 136 perform the same circuit operations as in the case of the first bit. A time taken for a series of processes for one such subblock is a subblock time.

As described above, in the digital driving display device that makes gradation display by pulse width modulation, for example the liquid crystal display device 10, digital video data has a low gradation level subfield to a high gradation level subfield (first to third bits in this example) as one block unit for each scanning line (each row). The digital video data is transferred to the liquid crystal panel 14 at a uniform transfer rate, while writing to the pixels 20 is performed by interlaced scanning such that the data of the subblocks SB1 to SB8 is written in order in row units to the pixels connected to each of the scanning lines 1 to 8 rather than sequential scanning. Therefore, the number of gradation levels is not limited by the transfer rate of minimum bits, and thus a low gradation level side can be expressed sufficiently.

More specifically, the horizontal driving circuit 13 has the load latch circuits 133 to 135 in stages (three stages in this example) corresponding in number to the number of subfields of the digital video data. The digital video data as display data transferred to the liquid crystal panel 14 is sequentially transferred to the load latch circuits 133 to 135 according to the period lengths of the subfields, while each pixel 20 is written by interlaced scanning. Thereby the data is written with subblocks as units. A sampling time (transfer time of the display data) is therefore constant without depending on the bits. Hence, the number of gradation levels is not limited by the transfer rate of minimum bits, and the number of gradation levels can be increased easily. It is thus possible to express a low gradation level side sufficiently.

FIG. 11 is a diagram showing a result of comparison between the case of sequential scanning and the case of interlaced scanning with respect to the transfer rate of display data input to the liquid crystal panel 14.

Letting the number of scanning lines 31 (=the number of subblocks) be V [lines], the number of signal lines 32 be H [lines], the number of bits (=the number of subfields) be B [bits], frame frequency be F [Hz], the number of pieces of parallel video data be N [pieces], a subfield time (minimum) be $(1/F)\times 1/(2^B-1)$ [sec], and a subblock time be $(1/F)\times(1/V)$ [sec], a minimum sampling time Ta in the case of the sequential scanning is $$Ta=(N/H)\times(1/V)\times(1/F)\times 1/(2^{B-1}) \text{ [sec]}$$

A minimum sampling time Tb in the case of the interlaced scanning is $$Tb=(N/H)\times(1/V)\times(1/F)\times(1/B) \text{ [sec]}$$

That is, in the case of the sequential scanning, when the number of subfields is increased with a larger number of bits, the number of pieces of data is increased, while the minimum sampling time Ta is the same. On the other hand, in the case of the interlaced scanning, when the number of subfields is increased with a larger number of bits, B is changed to (B+an amount of increase) in the equation of the minimum sampling time Tb.

As is clear from this comparison result, the interlaced scanning can greatly reduce the transfer rate of display data as compared with the sequential scanning. It is also possible to reduce the transfer rate of display data by increasing the number N of pieces of parallel video data obtained by converting the display data input to the liquid crystal panel 14 into parallel data.

Figure 12:
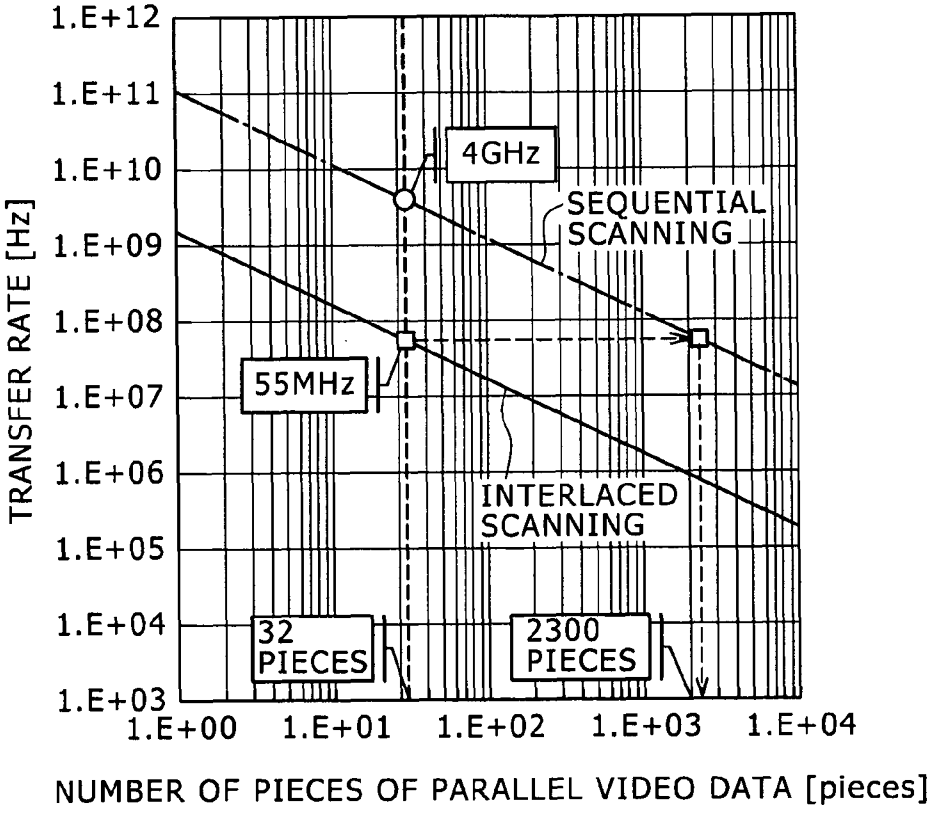
FIG. 12 is a diagram showing the resolution of WXGA and a diagram showing a relation between the numbers of pieces of parallel video data and transfer rates in the cases of the sequential scanning and the interlaced scanning at a resolution of WXGA.

FIG. 12 shows a resolution of WXGA (WideXGA) and a relation between the numbers of pieces of parallel video data and transfer rates in the cases of the sequential scanning and the interlaced scanning at a resolution of 1366 signal lines× 768 scanning lines, that is, a resolution of WXGA.

FIG. 12 indicates that the sequential scanning can achieve a transfer rate equal to that of the interlaced scanning by converting the display data input to the liquid crystal panel 14 into parallel data. However, as is clear from FIG. 12, when an equal transfer rate is to be achieved, the sequential scanning uses 2300 pieces of parallel video data, whereas the interlaced scanning uses 32 pieces of parallel video data. The interlaced scanning thus has an advantage of greatly reducing the number of connections.

It is to be noted that while the foregoing embodiment has been described by taking as an example a case where the present invention is applied to a liquid crystal display device using a liquid crystal cell as an electrooptic element of a pixel, the present invention is not limited to this application. The present invention is applicable to digital driving display devices in general that make gradation display by pulse width modulation, such as DLP (Digital Light Processing) display devices, EL (Electro Luminescence) display devices and the like.

In addition, while the foregoing embodiment sets a low gradation level subfield to a high gradation level subfield as one block of display data, the present invention is not necessarily limited to this subblock composition. For example, a subblock composition in which a plurality of low gradation level subfields to a high gradation level subfield are set as one block of display data may be used.

Further, while the foregoing embodiment has been described by taking as an example a case of transfer of a low gradation level side to a high gradation level side in order, the transfer of a low gradation level side to a high gradation level side in order is not necessarily performed; it is possible to perform a transfer while rearranging data arbitrarily within a subblock. A configuration that thus performs a transfer while rearranging data arbitrarily within a subblock has an advantage of reducing the number of load latch circuits (line memories).

It should be understood by those skilled in the art that various modifications, combinations, sub-combinations and alterations may occur depending on design requirements and other factors insofar as they are within the scope of the appended claims or the equivalents thereof.

What is claimed is:

1. A digital display device for making gradation display by pulse width modulation, said display device comprising:

a pixel array having a two dimensional array of pixels including an electrooptic element and incorporating a memory in a form of a matrix, a scanning line for each row and a signal line for each column;

horizontal driving means for inputting display data having a low gradation level subfield to a high gradation level subfield as one block unit for each scanning line, said subfields corresponding to each bit of the display data defining gradation levels of said pixels and having a period corresponding to gradation, sequentially transferring said display data by load latch circuits in a plurality of stages according to period length of said subfield, and supplying said display data to said signal line; and vertical driving means for selecting and scanning pixels of said pixel array unit in a row unit and performing scanning while jumping rows so as to write said display data supplied in said block unit from said horizontal driving means to pixels of said pixel array unit;

and further wherein said horizontal driving means has said load latch circuits equal in number to the number of said subfields are greater than 2.

2. A digital display device for making gradation display by pulse width modulation, said display device comprising:

a pixel array having a two dimensional array of pixels including an electrooptic element and incorporating a memory in a form of a matrix, a scanning line for each row a signal line for each column;

horizontal driving means including a sampling latch for receiving display data having a low gradation level subfield to a high gradation level subfield as one block unit for each scanning line, said subfields corresponding to each bit of the display data defining gradation levels of said pixels and having a period corresponding to gradation and load latch circuits in a plurality of stages for sequentially transferring said display data and supplying said display data to said signal line; and vertical driving means for selecting and scanning pixels of said pixel array unit in a row unit and performing scanning while jumping rows so as to write said display data supplied in said block unit from said horizontal driving means to pixels of said pixel array unit;

and further wherein said horizontal driving means has said load latch circuits equal in number to the number of said subfields are greater than 2.

* * * * *